United States Patent [19]

Vogel

[11] Patent Number: 4,761,036
[45] Date of Patent: Aug. 2, 1988

[54] PASSENGER SEAT SUPPORT STRUCTURE

[75] Inventor: Ignaz Vogel, Karlsruhe-Stutensee, Fed. Rep. of Germany

[73] Assignee: Ignaz Vogel GmbH Co., KG, Karlsruhe, Fed. Rep. of Germany

[21] Appl. No.: 70,307

[22] Filed: Jul. 6, 1987

[30] Foreign Application Priority Data

Oct. 1, 1986 [EP] European Pat. Off. ........ 86113514.3

[51] Int. Cl.⁴ ............................................... A47C 7/02
[52] U.S. Cl. ..................... 297/452; 297/440; 297/232
[58] Field of Search ............... 297/452, 230, 232, 440, 297/443, 445, 183; 248/903

[56] References Cited

U.S. PATENT DOCUMENTS

| | | | |
|---|---|---|---|
| 3,645,036 | 2/1972 | Biesterfeld et al. | 297/440 X |
| 3,866,976 | 2/1975 | Ohlsson | 297/445 |
| 3,989,299 | 11/1976 | DeLong | 297/232 X |
| 4,105,250 | 8/1978 | Caldwell | 297/445 |
| 4,277,101 | 7/1981 | Vogel | 297/232 |
| 4,422,691 | 12/1983 | Vogel | 297/445 X |
| 4,527,832 | 7/1985 | McMains et al. | 297/443 X |

FOREIGN PATENT DOCUMENTS

| | | | |
|---|---|---|---|
| 2204076 | 8/1972 | Fed. Rep. of Germany | 297/232 |
| 1408430 | 10/1975 | United Kingdom | 297/232 |

*Primary Examiner*—Kenneth J. Dorner
*Assistant Examiner*—Laurie K. Cranmer

[57] ABSTRACT

In a seat support arrangement for passenger vehicles wherein a number of seats with backrests are mounted on a seat support structure including a transverse frame supported by legs and consisting of two spaced struts and for each seat a support frame mounted on the struts, the struts are flat tubular profile spars having two partial box spar sections and two C-shaped track sections arranged in opposite corner areas and in such a manner that the C-shaped track sections are open in opposite directions and each slidably receives slot bolts for engagement with the seat legs beneath and, respectively, the support frames above.

3 Claims, 2 Drawing Sheets

PASSENGER SEAT SUPPORT STRUCTURE

BACKGROUND OF THE INVENTION

The invention relates to a twin passenger seat for installation in vehicles such as buses, ships or airplanes including a base with legs supporting two seat members with backrests rigidly or tiltably mounted thereon.

Like other seats, passenger seats need to be comfortable and have to have an appealing appearance but, in addition, they need to be "safe". Since such seats are subjected to much rougher wear and tear than normal seats, such seats must be extremely sturdy, they must be capable of withstanding crash energies without breakage, that is, they should be resilient, they need to remain free of rattles over long periods of use and they should be quite light. In addition it is important that they are economical to manufacture and also economical to maintain by providing easily exchangeable wear parts. Furthermore such seats should be easily mountable in the vehicle and easily adjustable to the space conditions available in a vehicle. Finally such seats when unassembled should require relatively little space so that they have only a small shipping volume, that is, they can be shipped unassembled in relatively small packages for economic reasons.

Applicant's earlier U.S. Pat. No. 4,422,691 discloses a passenger seat arrangement which, to a large extent, fulfills the objectives of the present invention, that is, it discloses a seat with a seat support structure including two support legs with an interconnecting transverse frame member and a mounting plate disposed on the frame member on which mounting plate the seat members and the backrests are supported. Such a seat structure has sufficient rigidity, yet yields without breakage when passengers are retained by such a seat during an accident; it is simple and easy to manufacture and can be shipped easily in a knocked-down state and it has also relatively little weight.

Nevertheless improvements are still desirable and the present invention relates to an improved design of such a seating structure.

SUMMARY OF THE INVENTION

In order to achieve a lightweight yet strong seat support arrangement for passenger vehicles such as buses, ships and airplanes, a seat support structure for a number of seats with backrests includes mounted on support legs a transverse frame structure consisting of two spaced flat struts on which for each seat a quadrilateral frame structure of quadrilateral tubes is edgewise mounted. The spaced flat struts are profile spars having two partial box spar sections and two C-shaped track sections extending along opposite edges thereof and being open in opposite directions and receiving slot bolts projecting from the profile spars in opposite directions, one set projecting downwardly in engagement with the support legs and another set projecting upwardly into engagement with the quadrilateral seat support frame for firmly engaging the seat support frame with the transverse frame structure thereby providing a unitary rigid yet lightweight seat support arrangement.

In the arrangement according to the invention the support beams are no longer double C-shaped in cross-section but rather consist of rectangular flat box spars which, as a result of their particular cross-sectional arrangement, are capable of taking up large forces and torques. The box spars have support frames disposed thereon which are extremely rigid as they consist of tube members of quadrilateral cross-section disposed edgewise and interconnected to form the quadrilateral frame. Altogether there is provided a seat base of extremely high rigidity however consisting of relatively little structural material. This is not only reduces the weight of such twin passenger seats but the design is simple and therefore easy to manufacture at relatively low costs. The flat box spars also have the advantage that no additional subframe for the mounting of the support legs is required, or that the support legs do not need to be as wide as the support structure or the seat sections.

All required additional components can easily be mounted on the box spars: Footrests and leg supports may be mounted to the underside of the box spars, and waste containers, tilt tables, separate armrests, center armrests and blinds, etc., may be mounted on the top side of the box spars without the need for any auxiliary support structures. It is particularly advantageous that all these components may be provided after assembly as after-market devices. It is also possible to arrange a wall mounting structure slidably on the underside of the box spars. Preferably, the box spars as used in connection with the invention consist of hard aluminum. Mainly for economical reasons the C-shaped groove areas have groove screws or bolts slidably disposed therein for connection with the support legs and with the mounting frame structure, which groove screws can be mounted more easily than the threaded blocks which have been slidably disposed in the frame grooves of earlier seat support arrangements.

In order to be able to utilize adjustment tracks of identical length for sideways slidable passenger seats of different width, the corner sections of the support frame have corner plates mounted thereon, which corner plates have a number of mounting holes arranged in a parallel array with the box spars and the adjustment tracks respectively.

It is further pointed out that the arrangement according to the invention is not only suitable for twin passenger seats but also for multiple seat arrangements as present for example in the back of buses or in other vehicles such as ships. It is also possible of course to utilize the arrangement according to the invention in connection with single seats.

SHORT DESCRIPTION OF THE DRAWINGS

DESCRIPTION OF THE PREFERRED EMBODIMENT

Figure 1:
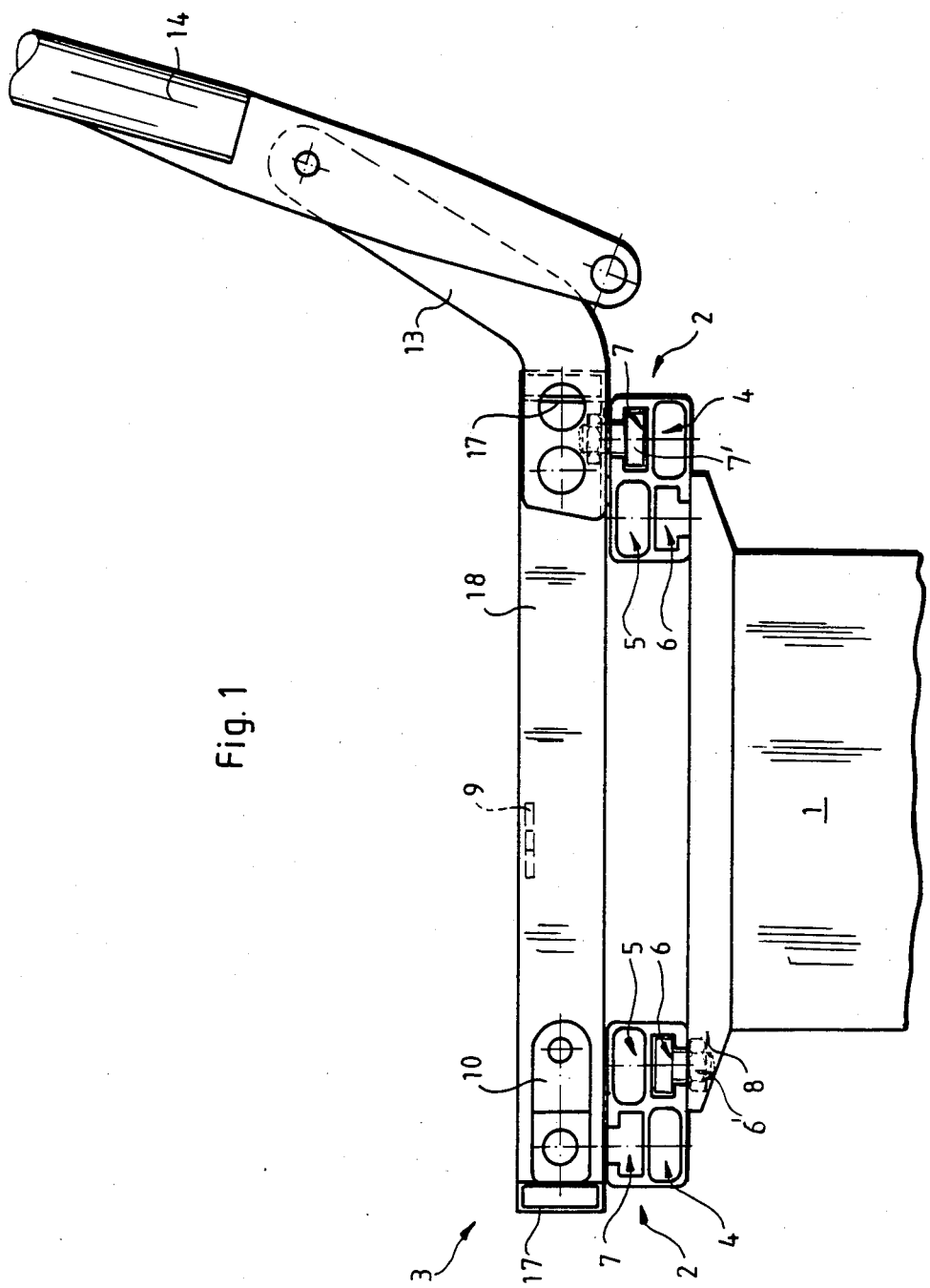
FIG. 1 is a side view of the seat support arrangement.

The seat support base in accordance with the invention consists of support legs 1, profile struts 2 bridging the support legs 1 and frame squares 3 forming seat support structures disposed on the profile struts 2. The profile struts 2 consist of flat box spars with two partial box spar sections 4, 5 and two track sections 6, 7 which are C-shaped in cross-section and integral with the box spars. A support leg 1 is mounted to the underside of the profile struts 2 by way of a transverse member 8. For this purpose groove bolts 6' are slidably inserted into the track sections 6 so that the support legs as a whole are slidably mounted on the underside of the seat supporting profile struts 2. The quadrilateral frames (squares) 3 are mounted to the top side of the profile struts 2 in the same manner, that is, slidably, by groove bolts 7' which extend into the track sections 7. The frame squares 3 consist of edgewise mounted tubes 17, 18 quadrilateral in cross-section so as to provide together with the profile struts 2 a very rigid support structure. Altogether the arrangement provides for a very stiff and rigid structure capable of withstanding large forces in spite of the fact that only relatively small amounts of materials are utilized in this design. Any kind of retaining or support structure 9, for example, for the seat upholstery, may be mounted on the frame squares 3 depending on the space conditions. Such structure may also include Z-shaped side brackets 10 for mounting gas struts, mounts 11 for shield members, support blocks 12 for an adjustment mechanism and for locking adjustment movement of the seats and also brackets 13 for pivotally supporting the backrests 14. In order to satisfy the requirements for seat belt mounts the profile struts may be provided with an additional angled rod 15 having a seat belt mounting structure 16 disposed thereon.

Figure 2:
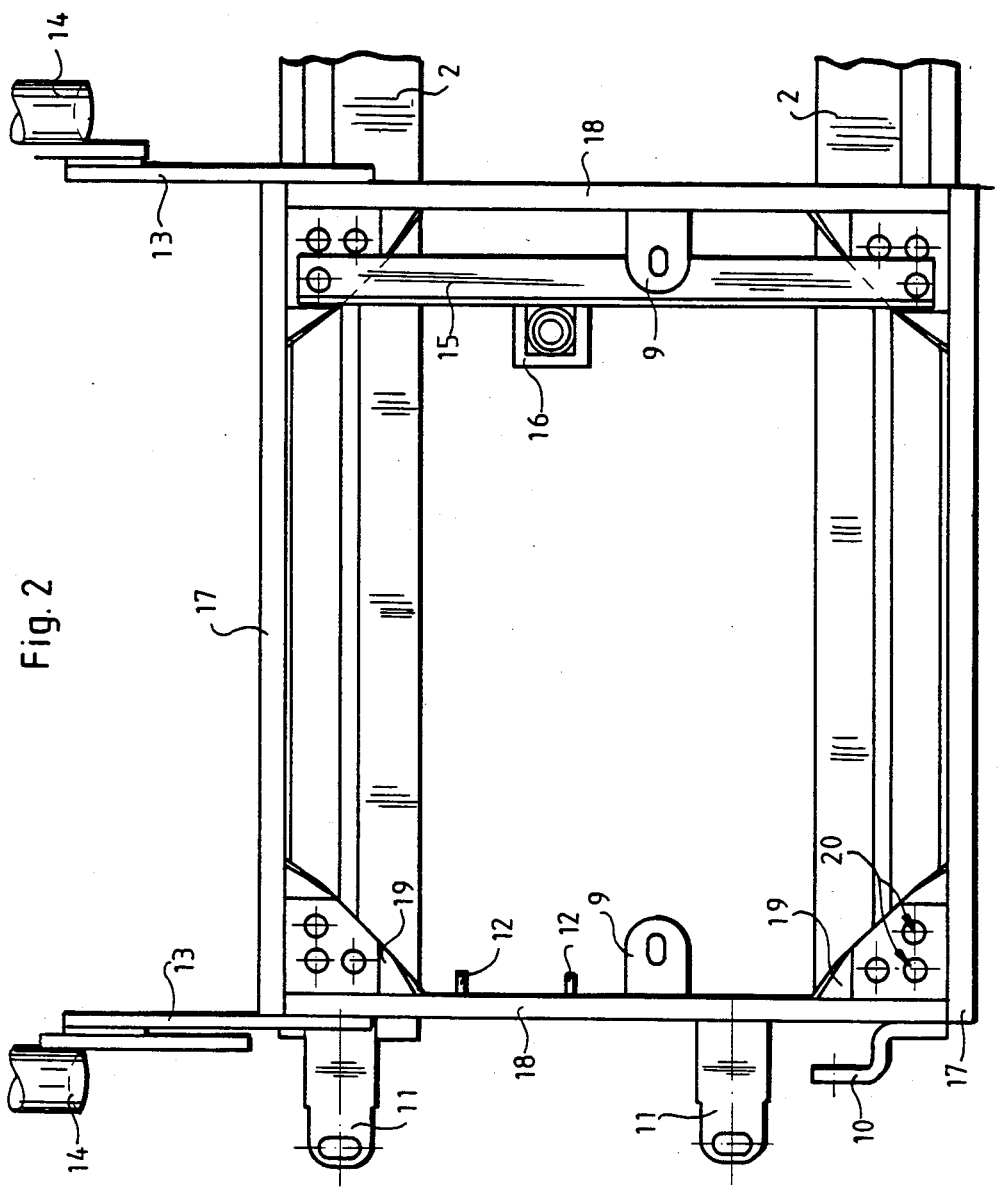
FIG. 2 is a top view of the seat support arrangement according to the invention.

As it is apparent from FIG. 2 the quadrilateral tubes 17, 18 arranged edgewise form a quadrilateral frame 3 which is reinforced by corner plates 19. The corner plates 19 have mounting holes 20 formed therein which mounting holes are aligned in the direction of the profile struts 2 for the mounting of the frame 3 directly on the profile struts 2 or on an adjustment track. In order to make it possible to use the same adjustment track in connection with seats of different width there are provided two mounting holes 20 side-by-side for selectively receiving the groove bolts for mounting the respective seat on the track.

What is claimed is:

1. A vehicle seat support arrangement for passenger vehicles on land, water or in the air, comprising a seat support structure carrying a number of seats and backrests mounted on said seats, said seat support structure including support legs, a transverse frame structure mounted on said support legs and consisting of two essentially tubular spaced parallel profile struts of quadrilateral cross-section and at least one quadrilateral support frame mounted on said profile struts and seat and backrest members mounted on said support frame, said profile struts having two partial box spar sections each having a closed cross-sectional shape and two C-shaped track sections integral with the box spar sections, all arranged along opposite edges of said profile struts such that said C-shaped track sections overlay said partial box spar sections with their tracks being open in opposite directions, and said quadrilateral support frames comprising tubular members of quadrilateral cross-section disposed edgewise on said profile struts, said support legs and said quadrilateral support frames being mounted to said profile struts by groove bolts disposed slidably in the grooves of the C-shaped track sections of the profile struts so as to form together a rigid yet lightweight support arrangement.

2. A vehicle seat support arrangement according to claim 1, wherein said profile struts consist of hard aluminum.

3. A vehicle seat support arrangement according to claim 1, wherein said support frame structures have mounted thereon corner plate members which have mounting holes extending therethrough and arranged in parallel alignment with said profile struts.

* * * * *